Dec. 16, 1952  L. D. MORSE  2,621,462
MOTOR VEHICLE MOUNTED MOWER
Filed Dec. 10, 1948  3 Sheets-Sheet 3
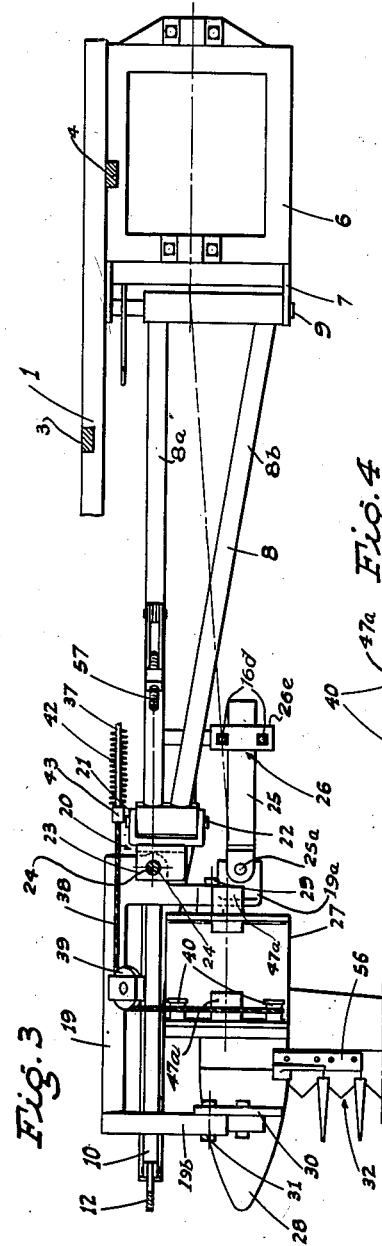
INVENTOR
Lyman D. Morse
BY
ATTORNEYS Patented Dec. 16, 1952

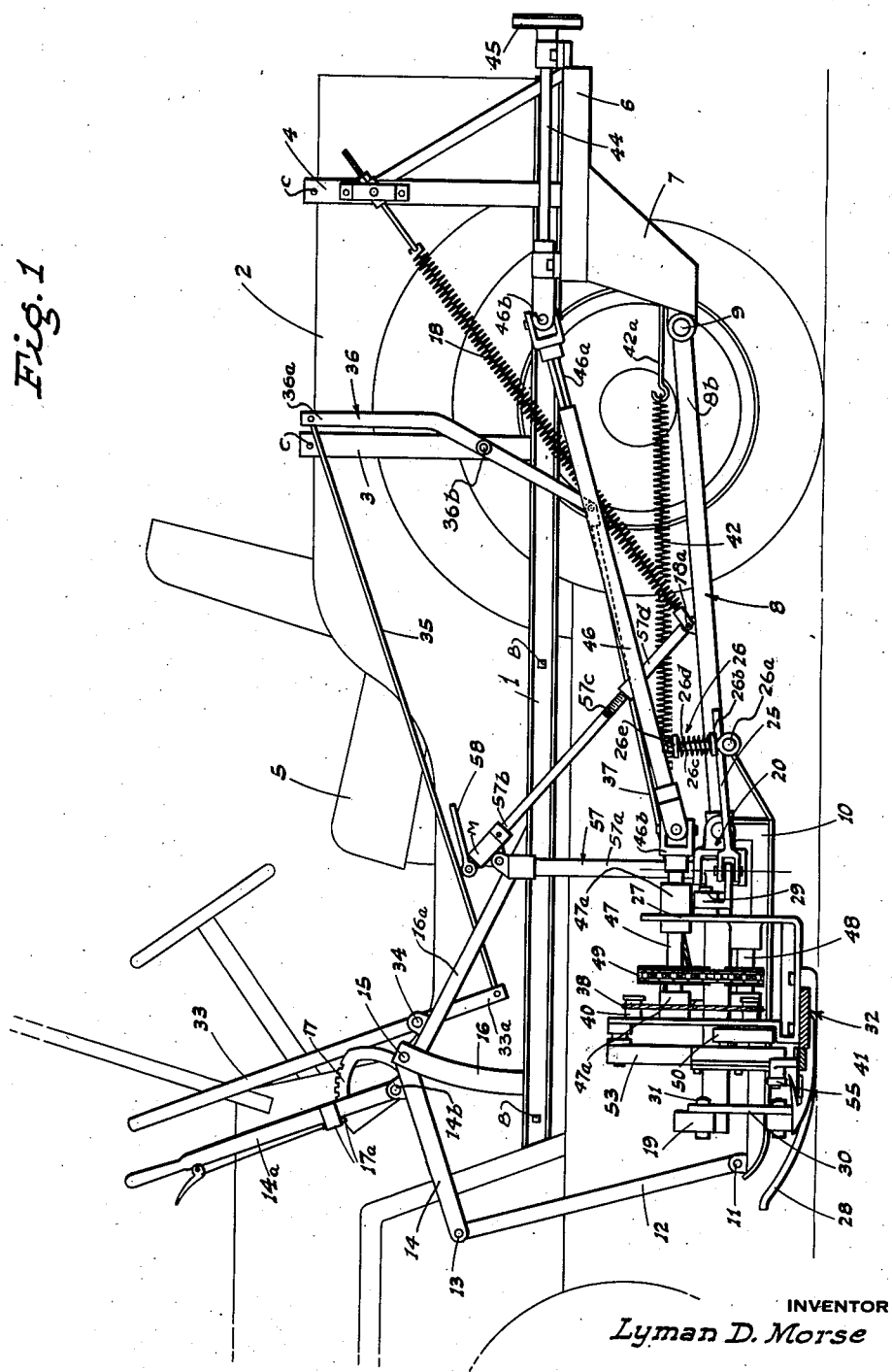

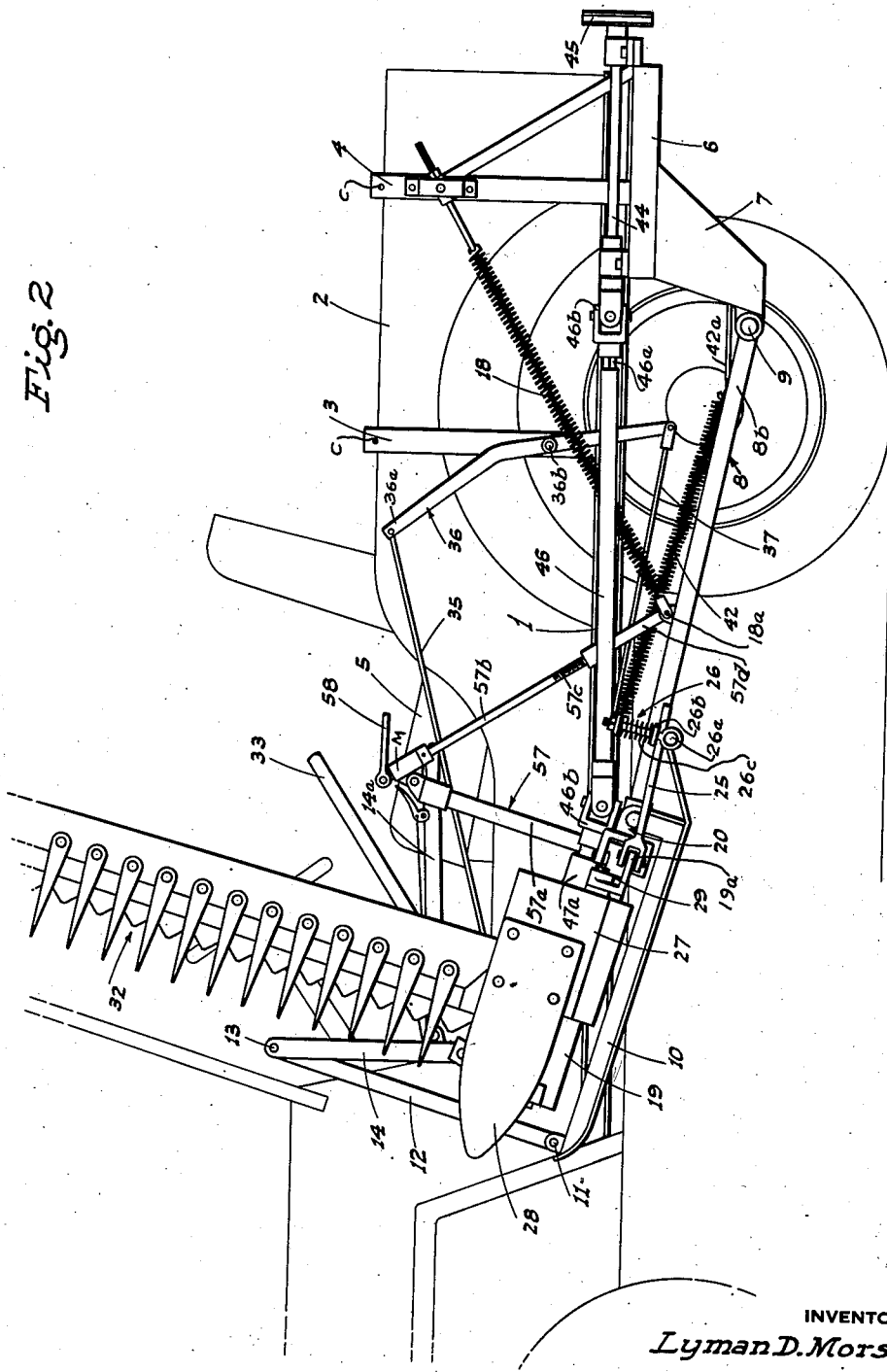

2,621,462

UNITED STATES PATENT OFFICE 2,621,462

MOTOR VEHICLE MOUNTED MOWER

Lyman D. Morse, Butte City, Calif.

Application December 10, 1948, Serial No. 64,517

6 Claims. (Cl. 56—25)

1

This invention is directed to, and it is an object to provide, a motor vehicle-mounted mower of novel construction and operation; the mower being especially designed, but not limited, for use in connection with a four-wheel vehicle of the type commonly known as a jeep.

Another object of the invention is to provide a mower, as above, which includes a novel mount for attaching the sickle bar unit to the motor vehicle; such mount being arranged for adjustment of said sickle bar unit between a lowered working position and a raised transport position without interference by any of the working parts.

A further object of the invention is to provide a mount, as in the preceding paragraph, which includes manual controls operative by the driver of the vehicle from his seat thereon.

An additional object is to provide a motor vehicle-mounted mower which includes a novel pitman drive for the sickle bar unit; such drive being actuated from a power take-off shaft of the vehicle.

It is also an object to incorporate—in the mount—structures which support the sickle bar unit for rearward yielding motion, and for adjustment of the vertical working angle of said sickle bar unit, the latter being manually adjustable by the driver while the mower is in operation.

A further object of the invention is to provide a practical and reliable motor vehicle-mounted mower, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the motor vehicle-mounted mower in lowered working position.

Fig. 2 is a similar view but shows the mower in raised transport position.

Fig. 3 is a plan view of the mount exclusive of the manual controls, with certain upwardly projecting parts removed or broken away and in section, and with the supported shafting and other mechanism omitted for clarity of showing of the mount parts.

Fig. 4 is a rear end elevation of the upstanding U-shaped sickle bar unit supporting frame, illustrating the connection of the lift cable thereto.

Fig. 5 is an enlarged fragmentary sectional elevation showing the connection of the C-shaped mounting frame, and the lift beam, with the push beam; the horizontal clevis member of the double clevis unit being broken away and in section.

Fig. 6 is an enlarged forward end elevation of the U-shaped supporting frame shown in Fig. 4, illustrating particularly the actuating mechanism for the sickle bar unit.

Referring now more particularly to the characters of reference on the drawings the motor vehicle-mounted mower comprises a longitudinal attachment beam 1 rigidly secured as by bolts B along one side of a four-wheel vehicle 2. At its rear end portion the attachment beam 1 includes a pair of upstanding posts 3 and 4 in spaced apart relation. These are clamped together adjacent the top to the upstanding sidewall of the vehicle as at C, so as to assist in maintaining the beam 1 in place. Said posts also serve for the mounting of other parts, as will hereinafter appear.

At its rear end, and some distance rearwardly of the vehicle seat 5, the attachment beam 1 is provided with a rigid, laterally, outwardly projecting bracket 6 which includes a depending flange 7. A longitudinal, push beam 8 having forwardly converging inner and outer legs 8a and 8b respectively, is pivoted, at its rear end, as at 9, to the depending flange 7 and projects forwardly therefrom in vertically swingable relation. At its forward end, which is generally in transverse alinement with the vehicle seat 5, the push beam 8 is rigidly connected by a cross head 8c thereon to the downwardly projecting portion 10a on the rear end of a forwardly projecting lift beam 10.

At its forward end the lift beam 10 is pivoted, as at 11, to an upstanding lift link 12; the latter being pivoted, at its upper end, as at 13, to the forward end of the lower leg 14 of a bellcrank, the upstanding leg of which is a hand lever 14a, the bellcrank being pivoted, as at 15, to a post 16 on the attachment beam 1. The hand lever 14a is within reach of the driver of the vehicle from the seat 5, whereby manipulation of said lever causes raising or lowering, selectively, of the push beam 8 and the parts mounted in connection therewith, as hereinafter described.

The upstanding hand-lever leg 14a of the bellcrank is independently pivoted on the leg 14 as at 14b, for convenient positioning, being normally held to position by a notched quadrant and latch assembly 17 and 17a between the legs 14 and 14a respectively.

An elongated counterbalancing spring 18 is connected between the push beam 8 as at 18a, intermediate its ends, and the post 4 adjacent the top of the latter as at 18b; such spring 18 thus extending at an upward and rearward incline from the push beam 8, to the end that said spring counterbalances vertical floating motion of said push beam.

The above described structure comprises the primary mounting frame of the mower.

Directly ahead of the forward end of the push beam 8 there is a laterally outwardly opening, C-shaped mounting frame 19 connected adjacent its rear corner to the front end of said push beam 8 by means of a double clevis unit, indicated generally at 20. Such double clevis unit 20 includes a horizontal axis clevis 21 connected by a transverse horizontal pivot 22 to said forward end of the push beam 8. Additionally, the double clevis unit 20 includes a vertical axis clevis 23 connected by a vertical pivot 24 to the C-shaped mounting frame 19. In this manner said C-shaped mounting frame is connected to the push beam 8 for vertical swinging motion, about pivot 22 as an axis, and for horizontal swinging motion about pivot 24 as an axis. The lift beam 10 is below the C-shaped mounting frame 19 whereby to not interfere with the above described movements of said frame.

Horizontal swinging motion of the C-shaped mounting frame 19 is resisted by means of a thrust tongue 25 which is pivoted as at 25a on the frame 19 and leads rearwardly from the rear outer end 19a of said frame 19 and passes through a friction drag unit 26. This unit comprises a circular bar 26a projecting laterally from and rigid with beam 8 and on which tongue 25 rests, a flat bar 26b resting on the tongue, and springs 26c bearing down on bar 26b and mounted on stems 26d turnable on and upstanding from bar 26a to the sides of the tongue; the stems being tied together above the springs by another cross bar 26e.

Within the laterally outwardly opening, C-shaped mounting frame 19 there is an upstanding U-shaped supporting frame 27, and a ground engaging shoe 28 is fixed in connection with the bottom of said frame 27, and projects forwardly therefrom.

The upstanding, U-shaped supporting frame 27 is pivoted in the C-shaped mounting frame 19 for rocking motion about a longitudinal axis by means of a pivot 29 between the outer end of the rear leg 19a of the C-shaped mounting frame 19, and the adjacent end of frame 27, and a rigid link 30 which upstands from the shoe 28 and pivots, as at 31, to the outer end of the forward leg 19b of said frame 19.

A sickle bar unit 32, of generally conventional construction, is fixed in connection with the bottom of the upstanding U-shaped supporting frame 27 and projects laterally outwardly therefrom. This arrangement permits of swinging of the frame 27 and the sickle bar unit 32 from a lowered working position of the latter, as in Figs. 1 and 3, to a raised transport position, as in Fig. 2.

Vertical swinging or adjustment of the sickle bar unit 32, together with the upstanding U-shaped supporting frame 27, is accomplished in the following manner:

Adjacent the bellcrank hand lever 14 there is another upstanding hand lever 33 pivoted, intermediate its ends, as at 34, for swinging movement in a longitudinal vertical plane on a brace 16a extending rearwardly and downwardly between the post 16 and the beam 1. A longitudinal rod 35 pivotally connects between the lower end 33a of the hand lever 33 and the upper end 36a of an upstanding lever 36 pivoted generally centrally of its length as at 36b on the post 3.

A pull rod 37 leads forwardly from the lower end of the lever 36, and adjacent the double clevis unit 20 connects to a lift cable 38 which turns about a sheave 39 mounted on the frame 19 intermediate its ends and extends outwardly through the upstanding U-shaped supporting frame 27 on spools 40 mounted on the front wall of said frame adjacent the top, and thence turns down and dead-ends, as at 41, on said frame 27 adjacent the bottom thereof. Thus, upon rearward swinging of the hand lever 33, the pull rod 37 is correspondingly moved, urging the lift cable 38 rearwardly, which in turn swings the frame 27, and the attached sickle bar unit 32, upwardly about the pivotal axis 29 of said frame. When in full raised position the sickle bar unit 32 passes slightly beyond dead-center for transport, and from which position it is dislodged for lowering by hand pressure.

When the sickle bar unit 32 is in its lowered working position, rearward swinging of said unit in a direction to urge the thrust tongue 25 through the friction drag unit 26 is resisted by a longitudinal tension spring 42 connected as at 42a between the depending flange 7 and the point of connection 43 of rod 37 with lift cable 38. See particularly Fig. 3. This arrangement normally maintains the sickle bar unit 32 in its proper laterally projecting position, but should said unit strike an obstacle it may yield rearwardly against the tension of spring 42, which tension is applied through the cable 38 to the C-shaped mounting frame 19 inwardly but ahead of the vertical axis of pivot 24. The tension of spring 42, while tending to prevent rearward swinging of the sickle bar unit 32, is not sufficient to lift said unit from the ground by pull on cable 38.

The sickle bar unit 32 is actuated by the following drive mechanism:

A longitudinal shaft 44 is journaled on top of the bracket 6, and said shaft is driven, at its rear end and from the rear power take-off shaft (not shown) of the vehicle, by means of an endless belt and pulley unit 45. A drive shaft 46 having a spline portion 46a and end universals 46b is connected to the forward end of the shaft 44, and thence extends longitudinally at a forward and downward incline to driving connection with a longitudinal shaft 47 projecting through journal bosses 47a fixed on the walls of the U-shaped supporting frame 27 adjacent the top thereof.

A longitudinal countershaft 48 is journaled in the frame 27 below shaft 47, and is driven by an endless chain and sprocket unit 49. At this point it should be noted that as the shaft 47 is carried in the frame 27 close and parallel to the pivot 29, adjustment of the sickle bar unit 32 and the frame 27 between lowered and raised positions does not materially affect the position of the splined universal drive shaft 46.

At its forward end, and ahead of the frame 27, the countershaft 48 is fitted with an eccentric 50 whose eccentric pin 51 runs in a vertical slot 52 of a swing lever unit 53. The swing lever unit 53 is pivoted, at its upper end, as at 54, to the upstanding U-shaped supporting frame 27, and depends from said pivot for swinging motion transversely of the direction of travel. At its lower end the swing lever 53 is coupled by a pitman link 55 which is pivotally attached to the adjacent or inner end of the blade 56 of the sickle bar unit 32 by end pivots 55a and 55b respectively (see Fig. 6).

With the above described arrangement, rotation of the driven countershaft 48 is converted to reciprocating motion of the blade 56, without the need of any exposed pitman rod.

In order to maintain the correct vertical working angle of the sickle bar unit 32 with respect to the ground, an adjustable upstanding A-frame 57 is connected between the push beam 8, intermediate its ends, and the upper end of the double clevis unit 20 as shown in Fig. 5. This A-frame comprises a rigid vertical front post 57a and a rear angled leg which includes an upper rotary portion 57b turnably supported in a swivel mount M on the post and having threads 57c on its lower portion, which adjustably screw into the non-rotary lower leg portion 57d. The upper leg portion 57b has a substantially radial handle 58 on its upper end so that said leg portion may be rotated and the effective length of the leg altered; this handle being accessible to the driver of the vehicle from the seat 5. This adjustment can be made while the mower is in operation; the effect of adjustment of the A-frame 57 being to relatively raise or lower the C-shaped mounting frame 19 about the pivotal axis 22.

The described motor vehicle-mounted mower provides a very practical and efficient implement, and the arrangement is such that all of the adjustments can be accomplished without interfering with any of the working parts, and all of the adjustments can be made readily and conveniently by the driver from his seat on the vehicle.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A mowing machine attachment for a motor vehicle comprising a rigid elongated beam, means on the beam for attaching it to the side of a motor vehicle, a rigid bracket projecting laterally outward from the rear end of the beam, a longitudinally extending shaft journaled on the bracket, means on the shaft for placing said shaft in driving relation with a power take off shaft on the motor vehicle, a depending flange on the bracket, a push beam unit pivoted at one end on a transverse horizontal axis to the flange and projecting forwardly therefrom, a post on the forward end of the first named beam, a bell crank lever pivoted on the bracket, a link connected between one leg of the lever and the forward end of the push beam, a mowing machine unit supported on the push beam adjacent its forward end, and means connecting said shaft in driving relation with such mowing machine unit.

2. A mowing machine attachment for a motor vehicle, said vehicle having a power take-off shaft; the attachment comprising a rigid elongated mounting beam adapted to extend along one side of and to be secured on the vehicle, a longitudinally extending push-beam unit, means pivotally supporting said push beam unit at one end from the mounting beam for swinging movement in a vertical longitudinal plane, a mower supporting frame mounted on the push beam unit at the other end thereof, a sickle bar unit mounted on and projecting laterally from the supporting frame, means to drive the sickle bar unit from the power take-off shaft, and a mechanism connected between the mounting beam and the push beam unit to control the swinging movement of the latter.

3. An attachment as in claim 2 in which the sickle bar drive means comprises a shaft journaled in connection with the mower supporting frame lengthwise of the push beam unit, another shaft journaled in connection with the mounting beam at the end thereof farthest from said supporting frame, and a spline shaft having universal-joint connection with the adjacent ends of the first named shafts.

4. An attachment as in claim 2, with means pivoting the supporting frame on the push beam unit for swinging movement about an axis lengthwise of said unit, and a mechanism connected between the mounting beam, push beam unit and the supporting frame to swing said frame and the sickle bar unit about said axis.

5. An attachment as in claim 2, in which the push beam unit is rigid from the point of pivotal connection with the mounting beam to the point of connection of the control mechanism therewith; said unit including an intermediate member pivoted at one end on the unit on a transverse axis and on which the supporting frame is mounted with means between said member and the unit to adjustably maintain the member against rotation on said axis.

6. An attachment as in claim 5, in which said member is mounted for independent rotation about an upstanding axis disposed adjacent said transverse axis; with means between said member and the rigid portion of the push beam unit to yieldably restrain rotation of the member about said upstanding axis in one direction.

LYMAN D. MORSE.

REFERENCES CITED

The following references are of record in the file of this patent:

UNITED STATES PATENTS

| Number | Name | Date |
| --- | --- | --- |
| 1,584,798 | Otwell | May 18, 1926 |
| 2,168,738 | Meinholdt | Aug. 8, 1939 |
| 2,204,335 | Wagner | June 11, 1940 |
| 2,245,448 | Simpson | June 10, 1941 |
| 2,288,950 | Johnson et al. | July 7, 1942 |